BANDWIDTH-REDUCTION SYSTEM

Filed Sept. 4, 1959 3 Sheets-Sheet 1

INVENTOR.
GEORGE T. INOUYE
BY
Lyon & Lyon
ATTORNEYS.

INVENTOR.
GEORGE T. INOUYE
BY Lyon & Lyon
ATTORNEYS.

INVENTOR.
GEORGE T. INOUYE
BY
Lyon & Lyon
ATTORNEYS.

United States Patent Office 3,037,083
Patented May 29, 1962

3,037,083
BANDWIDTH-REDUCTION SYSTEM

George T. Inouye, Gardena, Calif., assignor to Technicolor Corporation, Hollywood, Calif., a corporation of Maine Filed Sept. 4, 1959, Ser. No. 838,194
8 Claims. (Cl. 179—15.55)

This invention relates to systems for transmitting signals with a reduced bandwidth and, more particularly, to improvements therein.

The many advantages of reducing the bandwidth of signals which are being transmitted, such as requiring less spectrum space in transmission and affording economical recording of such signals, are fairly obvious. This has led to the expenditure of a great deal of effort to find methods and apparatus for reducing the bandwidth of signals. The present invention concerns itself with an arrangement for reducing the bandwidth of signals which have video-signal or television-signal characteristics.

An object of the present invention is to provide a novel and improved system for reducing the bandwidth of signals.

Another object of the present invention is to provide a video-signal bandwidth-reduction system which transmits all the information contained in the signal while reducing the bandwidth required for such transmission.

Still another object of the present invention is the provision of a system which reduces the bandwidth required for transmission of video signals and which affords, at a receiver, an arrangement for reliably reconstructing the video signals from the reduced-signal transmission which is received.

These and other objects of the present invention are achieved by splitting a signal, having video-signal characteristics, into first and second or high- and low-frequency components of the video signal. It is found that these high-frequency components do not occur a large number of times relative to the low-frequency components. In terms of the picture this means that areas requiring high-frequency signal components for reproduction, i.e., edges of objects, regions of fine detail, are small compared to the entire picture area. Thus, for illustration, the video-signal components occurring above one-half megacycle per second may constitute the first or high-frequency components and those occurring below one-half of a megacycle per second may constitute the low-frequency components.

Gating signals are then derived from these high-frequency components, which overlap in time duration the time duration of the high-frequency components from which they are derived. The high-frequency components are then stored without being spaced apart by the low-frequency areas. Thereafter the high-frequency signal components are scanned, or read out at a reduced rate relative to the storage rate, and transmitted over a correspondingly narrow spectrum bandwidth. The low-frequency signal components may be transmitted directly or encoded for transmission at a reduced bandwidth. The gating signals, which establish the time relationship between the high-frequency signal components and the low-frequency signal components for recreating the initial video signal, may then be encoded and thereafter transmitted.

At the receiver, the high-frequency signal components are stored at the reduced rate at which they were read out of storage for transmission. The gating signals are received and decoded. Means are provided at the receiver for preserving the time relationship of the gating signal relative to the received low-frequency components. The gating signal is then employed to read out the high-frequency signal component at the proper time and at the original rate of storage before transmission. The high frequency signal components and low-frequency signal components are then added together to recreate the initial video signal.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 6:
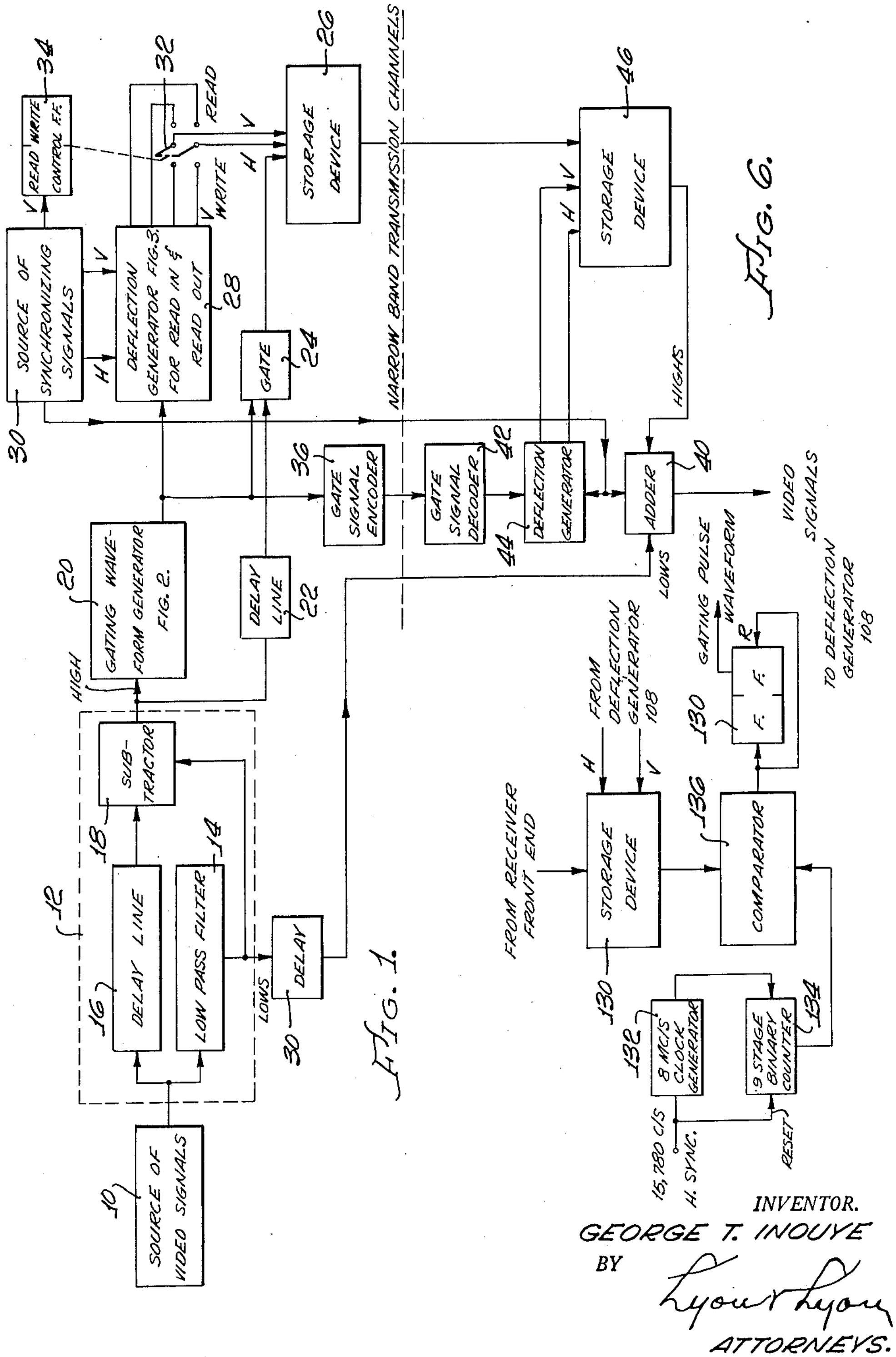
FIGURE 1 is a block diagram of an embodiment of the invention.
FIGURE 6 is a block diagram of a suitable gating waveform decoder.

Referring now to the drawings, FIGURE 1 is a block diagram of the embodiment of the invention. In order to clearly illustrate this invention, it will be described in connection with the transmission of television signals. This should not be construed as a limitation upon the invention, since it will be appreciated that any signals which have the characteristics of video signals may be handled thereby. In FIGURE 1, a source of video signals 10 which at this point in the system need not have the synchronizing signals inserted therein, has its output connected to a bandwidth splitter 12. The bandwidth splitter is a known device and comprises a low-pass filter 14, which only passes signals received from the source 10 which are below a predetermined frequency (for example, one-half megacycle). Also included in the bandwidth splitter is a delay line 16, which passes all of these signals received from the source 10 but after a time delay which is determined by the time required for the low-frequency components of the video signal to be derived from the low-pass filter. The output of the delay line and the low-pass filter are applied to a subtracting network 18, the function of which is to subtract the low-frequency components from the delayed video signal, whereby the high-frequency components remain and comprise the output of the subtracting network 18.

The high-frequency signal components are applied to structure identified as a gating waveform generator 20. The purpose of the gating waveform generator is to generate a gating pulse having a width which overlaps the width of the high-frequency component from which it is derived. The high-frequency components are also applied to a delay line 22 which delays them long enough for the gating waveform generator to generate a gating pulse having a duration slightly longer than the duration of the high-frequency component.

The output of the gating waveform generator 20 is applied to the gate 24 to open it and to enable it to pass the associated high-frequency signal components from the delay line 22 to a following storage device 26 for storage. The storage device is preferably an electrostatic storage tube of the type manufactured by Radio Corporation of America and called a "Radechon." The storage desired for the high-frequency signal components is one where the high-frequency signal components occur adjacent to one another, and not spaced as they are in the original video signal. Thus, during a writing interval the writing beam of the storage device 26 will be deflected by signals from a deflection generator 28. The deflection generator receives signals from the gating waveform generator as well as the source of synchronizing signals for the purpose of providing properly timed horizontal and vertical deflection signals to the storage device, whereby each time a high-frequency signal component occurs it is stored adjacent to the preceding high-frequency signal component regardless of the time interval which occurs between them.

The high-frequency signal components are stored in the storage device 26 compactly as they occur. However, they will be read out of storage at a uniform rate which is slower than the rate at which they are written into storage. Since the "Radechon" storage device is not a type which enables the simultaneous write-in and read-out of information at different rates, provision must be made for reading out the stored high-frequency signal components at periodic recurrent intervals. These intervals may be determined by the storage capacity of the "Radechon." A suitable interval, for example, is that required for a frame of television signals, or one-thirtieth of a second. Thus, two "Radechons" may be employed with writing occurring in one of the "Radechons" while read-out occurs in the other.

A switch 32 which is controlled from a read-write control flip-flop 34 will connect the required deflection signals from the deflection generator to the storage device during the write interval and the required deflection signals from the deflection generator during the reading interval. It will be appreciated that by the sorage device 26 it is intended that there be represented one or more of the "Radechons," magnetic core-storage media, or other suitable storage devices whereby the function of sumultaneous writing and read-out may be achieved.

The gating waveform, which comprises a series of pulses occurring over the same intervals and the same number of times as the high-frequency signal components, for economy and bandwidth, may be encoded using any suitable coding system. This function is here represented by the gate signal encoder 36. One suitable arrangement for a gating signal encoder, which can conserve the bandwidth required for its transmission, is described in an article in the Institute of Radio Engineers, Convention Record for 1958, published in May, by W. F. Schreiber et al., commencing with page 88. The low-frequency signal components may be encoded also, if desired, in the manner described in the article.

In FIGURE 1 herein, the low-frequency components are shown as being applied to a delay network 38 prior to being transmitted by a narrow-band transmission channel to a receiver. The output of the gate-signal encoder 36 is also transmitted through a narrow-band transmission channel to the receiver. The output of the storage device 26 is also transmitted over a narrow-band transmission channel. It will be appreciated that the output of the storage device 26 will comprise a continuous train of high-frequency signal components which have been stored over a predetermined interval. Horizontal and vertical synchronizing signals may also be transmitted from the source 30 over a narrow-band transmission channel.

If the receiver is connected to the transmitter by wire as, for example, in closed-circuit systems, the output of the delay network 38 may be applied to an adder 40 at the receiver. The delay of this delay network 38 will then be that required to regenerate the high-frequency signal components and to apply them to the adder for reconstructing the initial video signal. The received and coded gating signals are applied to a gate-signal decoder 42, which functions to regenerate the gating signals. These gating signals are applied to a deflection generator 44.

The output of the storage device 26 is received and stored in another storage device 46, which may be identical with the one at the transmitter. The received high-frequency signal components will be stored compactly, identically as they are read out of the storage device 26. The deflection generator 44, in response to the synchronizing signals received from the source 30 as well as the gate signals, will provide deflection signals for a properly timed read-out of the storage device 46. Each one of the high-frequency signal components is read out at a time when it should be combined with the low-frequency signal component to properly regenerate the initial video signal.

The reason for the overlapping duration of the gating signal will now become apparent. This is required in order to initiate the reading operation so that the high-frequency signal components are positioned accurately within one picture element in the output picture. If desired, the synchronizing signals may now also be inserted into the video signals by means of the adder 40.

Figure 2:
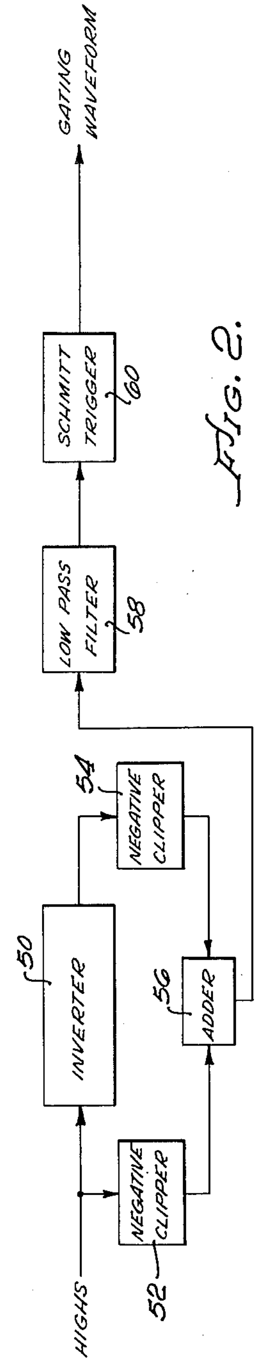
FIGURE 2 is a block diagram of a gating waveform generator suitable for use in the invention.

FIGURE 2 is a block diagram illustrating a suitable arrangement of well-known circuits, which may be employed for the gating waveform generator 20. These will include an inverter 50 and a negative clipper 52. The high-frequency components of the video signal are applied to the inverter and negative clipper 52. The inverter 50 is merely a phase inverter, and the negative clipper 52 may be a rectifier which passes only the high-frequency signals having one polarity. The output of the inverter 50 is applied to another negative clipper 54, which is substantially identical with the negative clipper 52. The outputs of both the negative clippers 52 and 54 are applied to an adder 56. The output of the adder will accordingly comprise both polarities of the high-frequency components of the video signal arranged in a unipolar sequence. The output of the adder 56 is applied to low-pass filter 58. This filter serves the function of widening the signals applied thereto, so that effectively the output of the low-pass filter 58 will comprise unipolar high-frequency components whose width overlaps the associated high-frequency components from which they are derived. The output of the low-pass filter 58 is applied to a Schmitt trigger circuit 60. The Schmitt trigger circuit, as is well known, in response to its input, provides a rectangular output. Thus there is obtained a train of substantially rectangular pulses having widths which overlap the high-frequency components of the video signal from which they are derived. These signals then comprise the gating signals which are utilized for both enabling compact storage at the transmitter and properly timed read-out from the storage device at the receiver.

Figure 3:
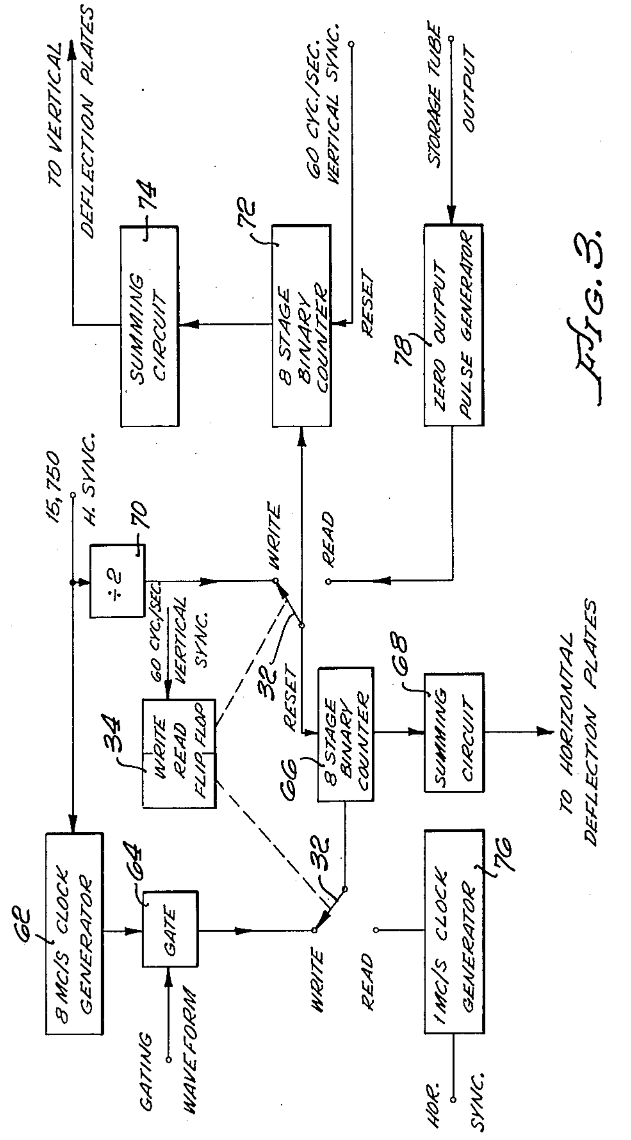
FIGURE 3 is a block diagram of a deflection waveform generator suitable for use in the invention.

FIGURE 3 is a block diagram of a suitable arrangement for the deflection generator 28 which is employed at the transmitter shown in FIGURE 1. There are employed well-known circuits which are represented by the block diagram. The deflection generator shown in FIGURE 3 is employed for both the stop-start type of deflection employed for storing information compactly in the storage device 26, as well as the continuous-sweep type of deflection required for read-out. An 8-megacycle clock generator 62, which is synchronized from the 15,750-cycles-per-second horizontal sync received from a source of synchronizing signals 30 (which exists at any television transmitter), applies its output to a gate 64. This gate remains closed until there is also applied thereto a gating pulse from the gating waveform generator 20. The output of the gate 64 will therefore comprise a number of pulses, occurring at an 8-megacycle rate, which number is determined by the width of the gating waveform. The switch 32, which is controlled from the write-read flip-flop 34 when in the write position applies the output of the gate 64 to an 8-stage binary counter 66. This counter advances its count in response to the pulses received from the gate 64. The output of the counter is converted to a deflection voltage by a summing circuit 68. This is the horizontal-deflection voltage which is applied to the storage device 26.

The horizontal-synchronizing frequency pulses, which have a repetition rate of 15,750 per second, are applied to a divide-by-two circuit 70. This can comprise a flip-flop circuit which is driven from one to the other of its two stable states in response to horizontal sync pulses being applied to its input. Thus, one of the flip-flop outputs 70 comprises a signal having a frequency which is half of that of the driving frequency, or 7,875 cycles per second. These signals are applied to reset the 8-stage binary counter 66. They are also applied by the switch 32 to another 8-stage binary counter 72 to advance its count state. The output of the binary counter 72 is applied to a summing circuit 74, which converts the voltage pattern presented by the counter into a deflection voltage suitable for application to the vertical-deflection plates of the storage device 26. The binary counter 72 is reset each time a vertical sync pulse occurs at each one-sixtieth of a second.

From the above description, it should become apparent that with the proposed storage device (i.e., the "Radechon") a digital type of deflection generator is preferably employed, which stores the high-frequency components of two lines of video signal on a single line. The combination of the 8-stage binary counter and summing circuit effectively comprise a digital-to-analog conversion system whereby a scanning-raster form of deflection is provided.

At the end of one field, indicated by the occurrence of the 60-cycle-per-second vertical sync pulse, the writing operation is terminated and a reading operation is initiated. The write-read control flip-flop 44 operates the relay switches 32 to connect to the read terminals. Thereby, the output of a one-megacycle clock generator 76 synchronized from the horizontal sync signals of the video transmitter is applied to the 8-stage binary counter 66. The counter is advanced through its eight counter stages at a rate of one megacycle per second and is reset each time a pulse at half the horizontal sync frequency is applied thereto from the divide-by-two circuit 70. A zero-output pulse generator 78 is connected to the output of the storage device to which the deflection signals are applied. Whenever the output of the storage device falls to zero or below a threshold level, indicative of the fact that no signals are being read out of the storage device, the zero-output generator generates a pulse which is applied to the 8-stage binary counter 72. It should be appreciated that the output of the storage device falls to zero whenever the end of a line is reached where no information is stored. Thus, a pulse is applied to the 8-stage binary counter 72 to increase the vertical-deflection voltage value each time the end of a line is reached.

Both 8-stage binary counters 66 and 72 are reset at the end of the reading operation to be available for the writing operation which occurs over the next sixtieth of a second. The digital deflection generator just described may be found described in detail in an article by F. C. Williams and T. Kilburn, entitled "A Storage System for Use with Binary Digital Computing Machines," published in the Proceedings of the I.E.E. (London), part III, vol. 96, pp. 81–100, 1949.

Where a limited storage-capability device such as the "Radechon" is employed, it becomes necessary to employ two of these storage devices together with two deflection generators. These are alternately employed in a manner so that when one of these is reading the other is writing, whereby continuous transmission of the signal as it occurs may be achieved. With storage media which have sufficient capacity for continuously recording the high-frequency signal components, the low-frequency signal components, the gating waveform, and the synchronizing signals, over the suitable interval achieved, for example, by video tape-recording mechanisms, the alternate reading-writing arrangement need not be employed at the transmitter.

Figures 4, 5:
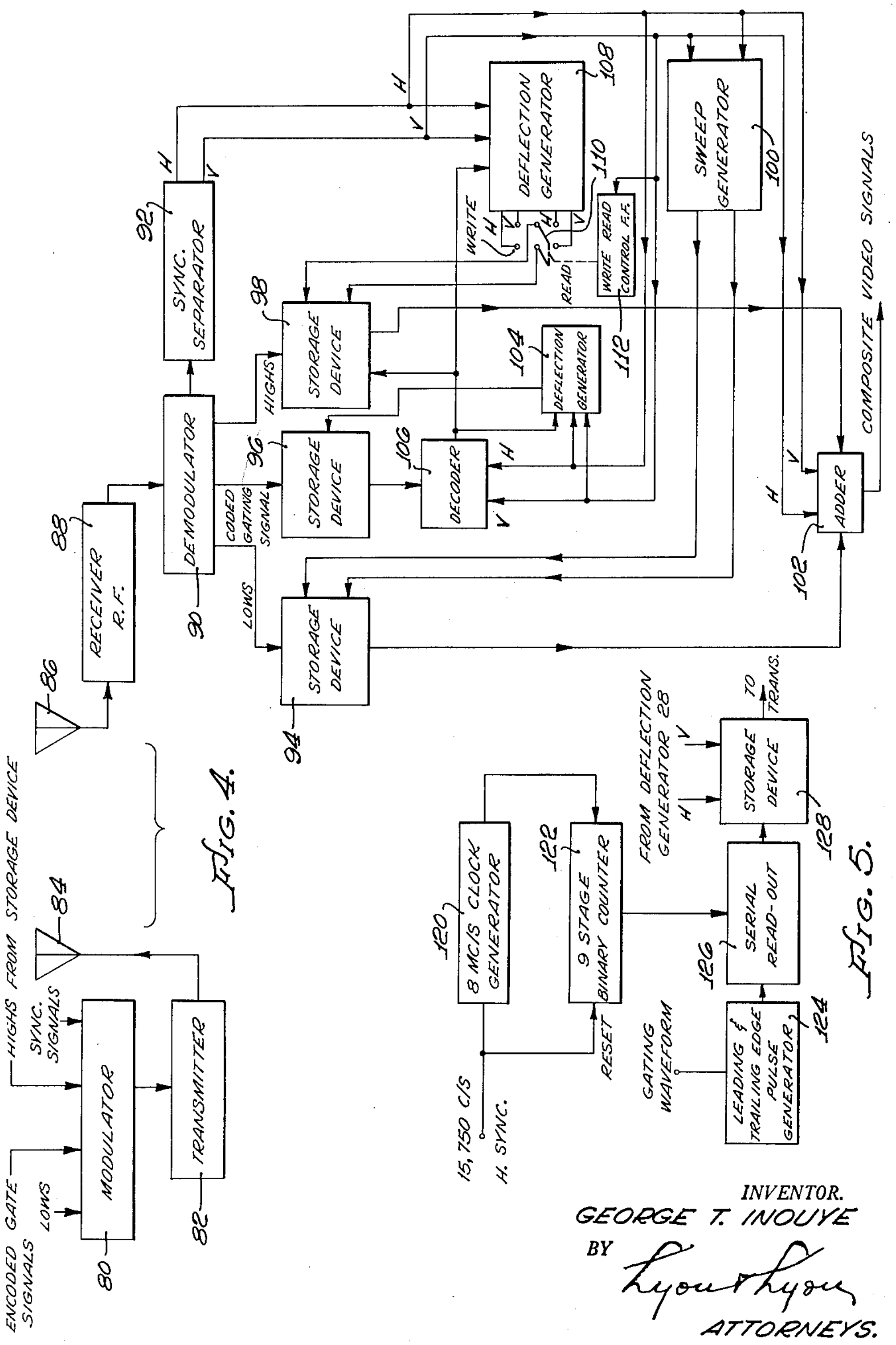
FIGURE 4 is a block diagram of a receiver suitable for use with a transmitter in accordance with an embodiment of the invention.
FIGURE 5 is a block diagram of a suitable gating waveform encoder.

FIGURE 4 is a block diagram of the circuits required at a receiver, which may be employed in this embodiment of the invention where such receiver receives the signals when they are transmitted over the air. At the transmitter, the low-frequency components, the encoded gate signals, the high-frequency components, and the sync signals are all applied to a modulator 80. This comprises well-known circuitry which modulates each one of these signals on a separate subcarrier. These are mixed and then applied to the transmitter 82 for modulatio non the RF carrier and subsequent transmission over the antenna 84.

The receiver antenna 86 applies the transmitted signals to the receiver RF section 88. The output of the receiver RF section 88 is applied to a demodulator 90, which serves the function of separating the received signals from the carrier and subcarriers on which they are modulated. The sync signals are derived by the sync separator 92. The low-frequency signal components, the coded gating signals, and the high-frequency components are all stored in the respective storage devices 94, 96, 98. These all may also be "Radechons." The rectangles 94, 96, 98, respectively, may comprise two "Radechons," one of which is used for storing the incoming information while the other has the information previously stored therein read out. The arrangement employed is substantially identical with that described for the transmitter.

A sweep generator 100 operates continuously in response to the horizontal and vertical sync signals received from sync separator 92, to enable the continuous writing of the low-frequency signals received during one field and thereafter the continuous reading of the stored information during the succeeding field. This sweep generator 100, therefore, may be of the type conventionally employed with the "Radechon" which performs the operations of storage and read-out successively at the same rate as is employed at the transmitter.

The output of the storage device 94 is applied to an adder circuit 102. Deflection signals, for storage of the coded gating signals in the storage device 96 as they are received and also for the purpose of read-out, are derived from a deflection generator 104. A suitable deflection generator 104 as well as a decoder 106, which decodes the output of the storage device 96 and provides gating signals, is described in the previously mentioned description of run-length coding. The deflection generator 104 operates to store the incoming coded gating signals at a continuous rate, synchronized by the vertical and horizontal sync signals derived from the sync separator 92. Read-out from the storage device 96, however, cannot occur at a continuous rate, but rather at the times relative to the continuous low-frequency signal components at which the gating signals were generated. The decoder 106 which is synchronized from the vertical and horizontal synchronizing signal, sets up the proper read-out intervals. It instructs the storage device to read out the stored coded gating signal, decodes this gating signal, and applies it to the deflection generator 104 to enable positioning of the cathode-ray beam used for read-out at the location of the succeeding coding gating signal.

The gating signal, which is the output of the decoder 106, is applied to the deflection generator 108, along with horizontal and vertical sync signals from the sync separator 92. The deflection generator 108 may have the same structure as has been described for the deflection generator 28. However, the relay switch 110 operates responsive to a write-read control flip-flop 112 180° out of phase with the operation of the corresponding read-write relay switch 32 at the transmitter. This arises by reason of the fact that the storage device 98 is required to store the received signals at the rate at which signals are being read out of the storage device at the transmitter. The read-out from the storage device 98 will occur while signals are written into the storage device at the transmitter. The gating signals control the horizontal deflection of the reading beam in order that read-out of the high-frequency components may occur over the same interval relative to the low-frequency components being read out of the storage device 94, as existed before the original video signal was divided into the two frequency components. The output of the storage device 98 is applied to the adder circuit 102, to be added to the low-frequency components of the video signal. The output of the adder circuit will accordingly comprise the original video signals. If desired, the horizontal and vertical synchronizing signals may also be applied to the adder, whereby the output from the adder will comprise the composite video signals.

FIGURE 5 shows a block diagram of a suitable "run-length" coding arrangement for encoding the gating signal at the transmitter. This arrangement is by way of example and should not be construed as a limitation upon the invention. An 8-megacycle clock generator 120 is synchronized by horizontal sync signals which occur at a rate of 15,750 cycles per second. The output of the 8-megacycle clock generator is applied to a 9-stage binary counter 122. Each time a 15,750-cycle pulse is received, it resets the 9-stage binary counter 122. Thus, 508 clock pulses are counted between reset intervals. The gating signal, which is derived from the gating waveform generator shown in FIGURE 1, is applied to the leading-trailing-edge pulse generator 124. This comprises a circuit for differentiating the gating waveform and deriving a pulse from the leading and trailing edges therefrom. These pulses are applied to a serial read-out gate 126, which comprises a plurality of gates for establishing a serial representation of the count indication of the 9-stage binary counter 122, which is parallel in form at the time of the occurrence of the inputs to the serial read-out. Two numbers are derived from the counter 122 for each gating waveform. These indicate the time of the beginning and the ending of the gating waveform during an interval corresponding to the interval occupied by one line of the video picture. Since the amplitude of a gating signal is fixed, this information need not be transmitted. The two numbers for each gating waveform are applied to a storage device 128.

The deflection signals for the encoded gating-signal storage device are derived from the same deflection generator 28 as is employed for controlling the cathode-ray beam for the storage device 26 for storing the high-frequency components. The deflection voltages applied to the storage device 128 are substantially the same as those applied to the storage device employed for the high-frequency components storage. The output of storage device 128 is applied to the transmitter for transmission in the manner previously described.

FIGURE 6 is a block diagram of the decoding apparatus at the receiver. The incoming and coded gating signals, in the form of two numbers representing the beginning and ending of a gating waveform, are received and stored in a storage device 130 similar to the one which was employed at the transmitter. The waveforms for controlling deflection are derived from a deflection generator 108, which may be the same as the one described in FIGURE 4, which is employed for deflecting the cathode-ray beam in the storage device used for storing the high-frequency components in the receiver. Thus, the storage will occur at a rate identical to the rate used in transmission. Read-out will occur at an asynchronous rate identical to the rate at which the information is entered into the storage device in the transmitter.

To achieve the latter, an 8 megacycle clock generator 132, identical to the one used at the transmitter, has applied thereto the horizontal sync signals. These signals synchronize the 8-megacycle clock generator. The output of the 8-megacycle clock generator 132 is applied to a 9-stage counter 134, also identical to the one employed at the transmitter. The 15,750 horizontal sync pulses are also applied to the 9-stage binary counter to reset it at the termination of each line. Thus, the 9-stage binary counter 134 will commence counting at the beginning of a line and cease at the end of a line. The output of the 9-stage binary counter, consisting of a sequence of numbers, is applied to the comparator 136. The comparator will compare the first number read out from the storage device with the sequence of numbers being generated from the 9-stage binary counter. When an identity is achieved, the comparator will accordingly produce an output pulse indicative thereof. This is applied to a flip-flop circuit 138. The flip-flop circuit will be set by the first identity pulse and will be reset by a second identity pulse. The second identity pulse occurs when there is identity between the next number read out from the storage device and the output of the 9-storage binary counter. With output being taken from the set side of the flip-flop circuit 138, a gating signal is obtained which has the same width as the gating signal which was encoded at the transmitter. This is applied to the deflection generator 108, whereby in combination with the horizontal and vertical pulses proper deflection signals are derived.

From the foregoing description, it will be appreciated that by assembling together the high-frequency component areas of a video picture, without their being spaced apart as they are in the normal transmission, these high-frequency areas can be scanned and transmitted at a continuous rate over a narrow bandwidth than is required with the present systems. Thereafter at the receiver, by means of gating signals, the high-frequency components can be combined with the low-frequency components at the proper time in order to reproduce the initial video signal. The high-frequency information is stored and transmitted by reading out with a regular scanning beam at a reduced bandwidth. If the highs occur over a fraction "F" of the picture area, the read-out scan is expanded to cover only "F" times the number of picture elements per second, as compared to the original video signal, and, hence, only "F" times the original bandwidth is required. It should be noted that "F" is not a whole number integer.

Accordingly, there has been described and shown herein a novel and useful video-signal bandwidth-reduction system.

I claim:

1. A reduced-bandwidth video-signal transmission system comprising means to which video signals are applied for splitting said video signals into first and second frequency components which are respectively above and below a predetermined frequency, means for generating gating signals from said first frequency components each having its duration determined by the duration of a first frequency component from which it is generated, storage means, means for applying said first frequency components and said gating signals to said storage means for enabling successive storage of said first frequency components responsive to said gating signals, means operative at predetermined regular intervals for continuously reading out from said storage means at a rate different than said rate of storage the first frequency components stored therein over the preceding one of said predetermined intervals, delay means to which said second frequency components are applied for delaying said second frequency components, means to which said gating signals are applied for encoding, and transmitting means to which the output of said delay means, encoding means, and storage means are applied for transmission.

2. A reduced-bandwidth video-signal transmission system as recited in claim 1 wherein said means for generating gating signals from said first frequency components includes circuit means for providing a train of signals having only one polarity from said first frequency components, low-pass filter means to which said train of signals is applied for widening each signal in said train, and trigger circuit means to which the output of said low-pass filter means is applied for providing a substantially square-wave pulse at the same duration for each of the signals in the output of said low-pass filter means.

3. A reduced-bandwidth video-signal system comprising means to which video signals are applied for splitting said video signals into first and second frequency components, said first frequency components being determined as those frequency components of said video signals which occupy a broad bandwidth and occur infrequently relative to the remaining frequency components of said video signals which comprise said second frequency components, means to which said first frequency components are applied for generating gating signals each of which has its width determined by the duration of a first frequency component from which it is generated, and a time association with said second frequency components which is the same as the time association therewith of the first frequency components from which said gating signals were derived, storage means, means for applying said gating signals and said first frequency components to said storage means for enabling successive storage of said first frequency components responsive to said gating signals, means operative at predetermined regular intervals for continuously reading out from said storage means at a rate different than the rate of storage of said first frequency components stored therein over the preceding one of said predetermined intervals, encoding means to which said gating signals are applied for encoding said gating signals, means for transmitting said first frequency components which are read out from said storage means, said encoded gating signals and said delayed second frequency components, means for receiving said transmitted first frequency components, second frequency components and encoded gating signals, first means for storing said received first frequency components, second means for storing said received encoded gating signals, third means for storing said received second frequency components, means for reading out said second frequency components from said third storage means, means for reading said encoded gating signals from said second storage means, means for decoding said encoded gating signals to re-establish the original time association with said second frequency components, means for reading out from said first storage means said first frequency components responsive to said decoded gating signals, and means to combine said first and second frequency components as they are read out of said first and third storage means to recreate said video signals.

4. A reduced-bandwidth video-signal system comprising means to which video signals are applied for splitting said video signals into first and second frequency components, said first frequency components being determined as those frequency components of said video signals which occupy a broad bandwidth and occur infrequently relative to the remaining frequency components of said video signals which comprise said second frequency components, means to which said first frequency components are applied for generating gating signals each of which has its width determined by the duration of a first frequency component from which it is generated, and a time association with said second frequency components which is the same as the time association therewith of the first frequency components from which said gating signals were derived, storage means, means for applying said gating signals and said first frequency components to said storage means for enabling successive storage of said first frequency components responsive to said gating signals, means operative at predetermined regular intervals for continuously reading out from said storage means at a rate different than the rate of storage of said first frequency components stored therein over the preceding one of said predetermined intervals, encoding means to which said gating signals are applied for encoding said gating signals as a first number and second number respectively representing the times at a gating signal start and stop relative to a reference time, means for transmitting said first frequency components which are read out from said storage means, said encoded gating signals and said delayed second frequency components, means for receiving said transmitted first frequency components, second frequency components and encoded gating signals, first means for storing said received first frequency components, second means for storing said received encoded gating signals, third means for storing said received second frequency components, means for reading out said encoded gating signals from said second storage means, means for converting said gating signals encoded as first and second numbers into gating signals properly related in time to said reference time, means for reading said second frequency components from said third storage means responsive to said gating signals, means for reading out from said first means for storing first frequency components, and means for combining said first and second frequency components to recreate said video signals.

5. A system for reducing the bandwidth required for transmitting video signals comprising means for splitting said video signals into first and second frequency components, said first frequency components being determined as those frequency components of said video signals which occupy a broad bandwidth and occur infrequently relative to the remaining frequency components of said video signals which comprise said second frequency components, means for generating gating signals responsive to said first frequency components having a time duration which overlaps that of said first frequency components from which they are generated, a normally closed gate, means for applying said gating signals to said normally closed gate to open it in response thereto, first delay means to which said first frequency components are applied for delaying said first frequency components until the associated gating signals generated therefrom can be applied to said normally closed gate, means for applying the output of said first delay means to said normally closed gate to be passed therethrough responsive to said associated gating signals, first storage means, means for applying said gating signals to the output of said normally closed gate to said first storage means for successively storing said first frequency components responsive to said gating signals, means operative at predetermined intervals for continuously reading out said first frequency components from said first storage means at a rate different than the rate of storage of said first frequency components stored therein over the preceding one of said predetermined intervals, encoding means to which said gate signal is applied for encoding, a delay circuit to which said second frequency components are applied for delay, means for transmitting the output of said delay circuit, encoding means and said means for reading out from said first storage means, means for receiving the output of said means for transmitting including a second storage means for storing the received first frequency components output from said means for reading out from said first storage means, means for decoding the received output of said encoding means to re-establish said gating signals, means for reading out first frequency components from said first storage means responsive to said re-established gating signals, and means for recombining said first frequency components and said received second frequency components to re-establish said video signals.

6. A system for reducing the bandwidth required for transmitting video signals comprising means to which video signals are applied for splitting said video signals into first and second frequency components, said first frequency components being determined as those frequency components of said video signals which occupy a broad bandwidth and occur infrequently relative to the remaining frequency components of said video signals which comprise said second frequency components, means to which said first frequency components are applied for generating gating signals each of which has its width determined by the duration of a first frequency component from which it is generated, and a time association with said second frequency components which is the same as the time association therewith of the first frequency components from which said gating signals were derived, storage means, means for applying said gating signals and said first frequency components to said storage means for enabling successive storage of said first frequency components responsive to said gating signals, means operative at predetermined regular intervals for continuously reading out from said storage means at a rate different than the rate of storage of said first frequency components stored therein over the preceding one of said predetermined intervals, encoding means to which said gating signals are applied for encoding said gating signals as a first number and second number respectively representing the times at a gating signal start and stop relative to a reference time, and means for transmitting said first frequency components which are read out from said storage means, said encoded gating signals and said delayed second frequency components.

7. A system for reducing the bandwidth required for transmitting video signals comprising means for splitting said video signals into first and second frequency components, said first frequency components being determined as those frequency components of said video signals which occupy a broad bandwidth and occur infrequently relative to the remaining frequency components of said video signals which comprise said second frequency components, means for generating gating signals responsive to said first frequency components having a time duration which overlaps that of said first frequency components from which they are generated, a normally closed gate, means for applying said gating signals to said normally closed gate to open it in response thereto, first delay means to which said first frequency components are applied for delaying said first frequency components until the associated gating signals generated therefrom can be applied to said normally closed gate, means for applying the output of said first delay means to said normally closed gate to be passed therethrough responsive to said associated gating signals, first storage means, means for applying said gating signals and the output of said normally closed gate to said first storage means for successively storing said first frequency components responsive to said gating signals, means operative at predetermined intervals for continuously reading out said first frequency components from said first storage means at a rate different than the rate of storage of said first frequency components stored therein over the preceding one of said predetermined intervals, encoding means to which said gate signal is applied for encoding, a delay circuit to which said second frequency components are applied for delay, and means for transmitting the output of said delay circuit, encoding means and said means for reading out from said first storage means.

8. In a system for reducing the bandwidth required for transmitting video signals, such video signals being transmitted as first and second frequency components of said video signals and gating signals, said first frequency components being determined as those frequency components of said video signals which occupy a broad bandwidth and occur infrequently relative to the remaining frequency components of said video signals which comprise said second frequency components, said gating signals comprising signals generated from said first frequency components which relate the occurrence in time of said first frequency components to said second frequency components, a receiver for said transmitted signals comprising means for receiving said first and second frequency components and said gating signals, first means for storing said first frequency components, second means for storing said gating signals, third means for storing said second frequency components, means for deriving said second frequency components from said third means for storing with substantially the same time relationship as they occur within the video signals from which they were derived, means for deriving said gating signals from said second means for storage with the same time relationship to said second frequency components as occurs when they are generated, means for deriving said first frequency components from said first storage means responsive to said gating signals derived from said second means for storage, and means for combining said first and second frequency components to regenerate the video signals from which they were derived.

References Cited in the file of this patent

UNITED STATES PATENTS

| | | |
|---|---|---|
| 2,321,611 | Moynihan | June 15, 1943 |
| 2,629,010 | Graham | Feb. 17, 1953 |
| 2,824,904 | Toulon | Feb. 25, 1958 |
| 2,921,124 | Graham | Jan. 12, 1960 |